United States Patent [19]

Chase

[11] 4,358,274

[45] Nov. 9, 1982

[54] GAME AND TEACHING DEVICE CONSTRUCTION

[76] Inventor: Herbert S. Chase, One Lincoln Plz., New York, N.Y. 10023

[21] Appl. No.: 71,916

[22] Filed: Sep. 4, 1979

[51] Int. Cl.³ .............................................. G09B 1/16
[52] U.S. Cl. .................................. 434/205; 434/403; 46/1 R
[58] Field of Search ............... 35/31 G, 32, 70, 29 E; 46/1 R, 1 N; 40/453; 182/196; 211/118; 273/1 A; 434/402, 205, 403; 292/345

[56] References Cited

U.S. PATENT DOCUMENTS

| | | | |
|---|---|---|---|
| 386,883 | 11/1888 | Heinemann | 40/453 |
| 1,246,152 | 11/1917 | Perrine | 35/31 G X |
| 2,523,392 | 9/1950 | Rabinowitz | 292/345 |
| 3,621,601 | 11/1971 | Greenberg | 46/1 R |
| 4,122,782 | 10/1978 | Coombs | 211/118 X |
| 4,189,030 | 2/1980 | Leslie | 182/196 |

FOREIGN PATENT DOCUMENTS

| | | | |
|---|---|---|---|
| 2218689 | 12/1972 | Fed. Rep. of Germany | 46/1 R |
| 217766 | 6/1924 | United Kingdom | 182/196 |

OTHER PUBLICATIONS

Cleo Learning Aids Catalog, Feb. 1976, p. 104, "Footsteps To Numbers", and Number Vocabulary Cards.

*Primary Examiner*—H. S. Skogquist
*Attorney, Agent, or Firm*—Wolder, Gross & Yavner

[57] ABSTRACT

A game and teaching device construction is described to include a plurality of indicia bearing blocks bound together by a pair of flexible straps. Each block is generally shaped in the form of a solid rectangle whereby a first strap is affixed to each block at one end thereof and a second strap is affixed to each block at the other end thereof. Each block includes front and back faces with one of such faces bearing indicia, for example a plurality of dots, and the other face bearing indicia of the number corresponding to the number of dots on the first described face. When stretched out, the construction is such that pushing the first block will cause the collapse of it and all other blocks in sequence. Furthermore, the construction can be used such that a child is interrogated to associate a number with the number of dots showing on a particular block, with the other face of the block being used to verify the child's answer.

5 Claims, 7 Drawing Figures

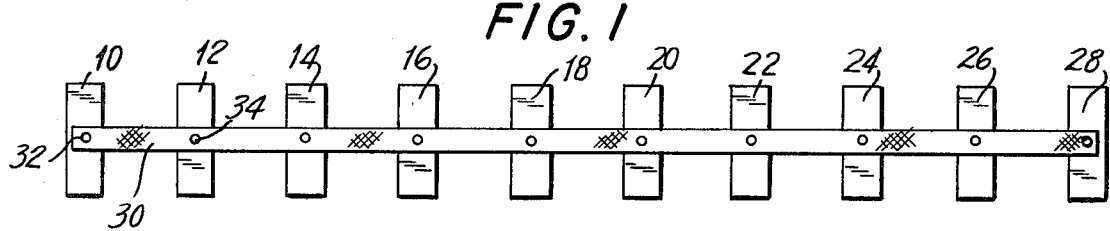
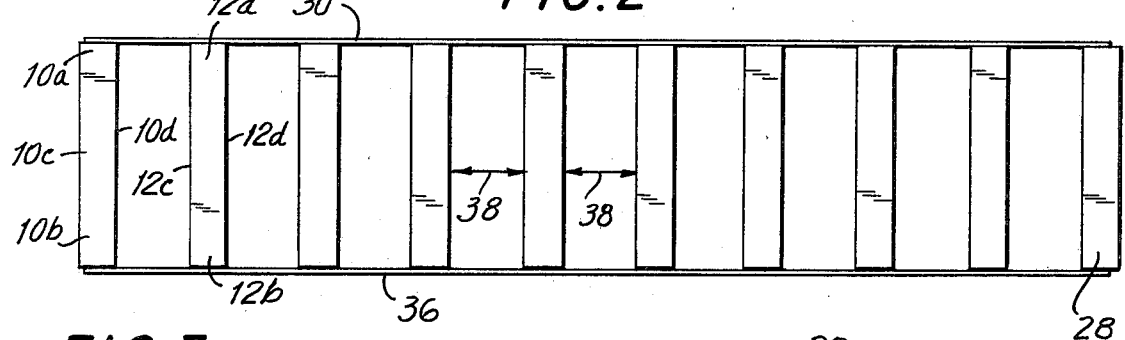
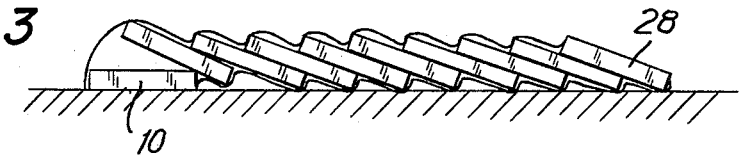
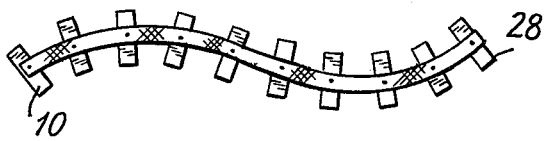
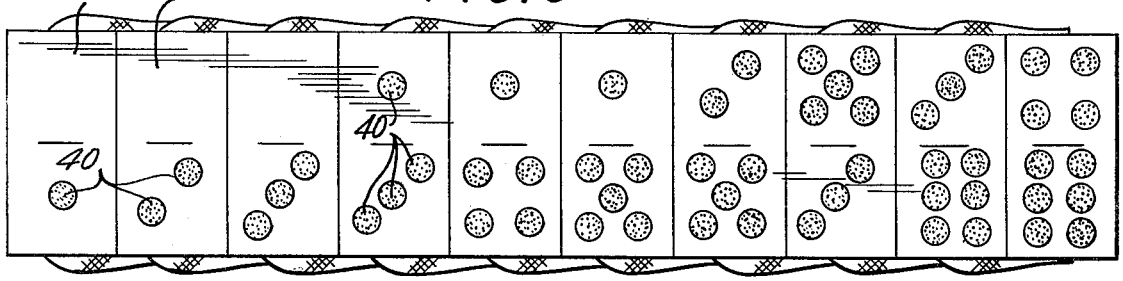
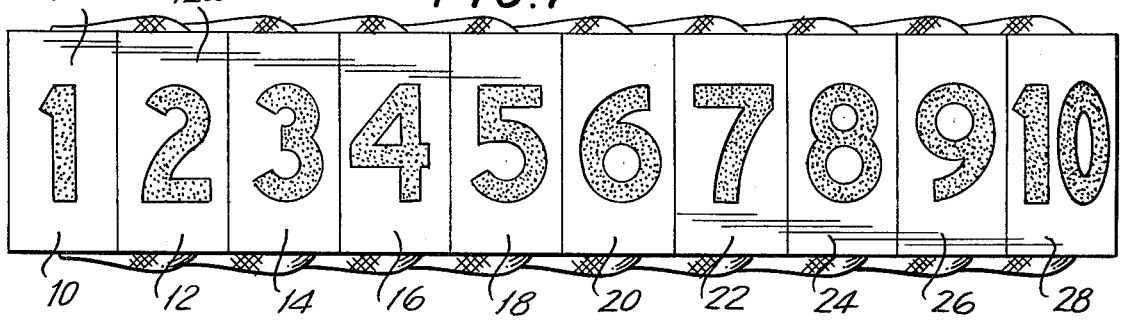

GAME AND TEACHING DEVICE CONSTRUCTION

This invention relates primarily to game and teaching aid device constructions and more particularly to such constructions which are comprised of blocks and straps.

The game of "Dominoes" has been popular for many years. Its game elements and rules are relatively simple. Stated briefly, the game elements consist of solid rectangular blocks including one face having two halves bearing indicia. For instance, the first half might include three dots and the second half five dots. The game is played by players in turn matching one exposed face in a line of "Dominoes" with a "Domino" bearing a half face having the same number of dots as the exposed "Domino" half already in the line.

The game of "Dominoes" may be improved upon in two respects: firstly, the pieces are separated and may be easily lost; and secondly, the game presumes an age level whereby the number of dots can be mounted and provides little help as a teaching aid for counting.

Also, many other such constructions exist whereby indicia are associated with blocks, but such constructions suffer from similar drawbacks, especially in terms of the independence of pieces, whereby they can be lost.

Accordingly, a primary object of the present invention is to provide a game and teaching device construction which includes a number of game blocks and means for affixing such blocks, one to the other.

A further and more particular object of the present invention is to provide a construction of the type described wherein the game blocks are affixed to each other in a certain sequence.

A still further object of the present invention is to provide a teaching device construction wherein game blocks are provided, each having opposite faces for displaying on one the information translating the information on the other face.

These and other objects of the present invention are provided in a game and teaching device construction which features a plurality of blocks, each in the form of a solid rectangle or another convenient shape whereby top and bottom ends of each block are affixed by a flexible strap, or the like, attached to the top and bottom ends, respectively of the other blocks. The blocks are so arranged in a line such that when the affixing straps are relatively stretched out so that an even spacing occurs between blocks, the pushing of the first block in the line will lead to its toppling and the toppling in sequence of the other blocks. Furthermore, the length of the straps are such that each block individually can be turned over to expose a selected face of a single block. In this way, indicia such as dots are printed on one face of each block and the number corresponding to such dots is printed on the opposite face. The same can be obtained with respect to letters being on one face of a block and a picture beginning with or including such letter on the opposite face of that block.

Other objects, features and advantages of the present invention will become apparent by reference to the following more detailed description of a preferred, but nonetheless illustrative, embodiment, with reference to the accompanying drawings, wherein:

FIG. 1 is a top view representation of an arrangement of blocks tied together by strap means according to the invention construction;

FIG. 2 is a front view thereof;

FIG. 3 is a front view representation of the blocks and straps of FIGS. 1 and 2, with such blocks toppled by pushing an end block of the construction;

FIGS. 4 and 5 are representations in top view, similar to that of FIG. 1, but showing various shapes of the overall arrangement of blocks which can be obtained with the present invention;

FIG. 6 is a front, elevational view similar to that of FIG. 2, but showing blocks slightly rotated to expose the first face bearings dots for each block; and FIG. 7 is a representation similar to that of FIG. 6, but showing blocks rotated to expose the opposite face of the blocks with indicia bearing numbers corresponding to the total of dots on the opposite face of the respective blocks.

Referring to the drawings, FIGS. 1 and 2 show a plurality of blocks 10–28, each in a form having first and second ends 10a, 10b, 12a, 12b and first and second opposite faces 10c, 10d, 12c, 12d. Such form is a solid rectangle or any convenient shape providing ends and faces as aforesaid. A first affixing flexible member 30 is being affixed to each first end 10a, 12a . . . of blocks 10–28 by means of nails 32, 34 . . . .

Likewise, second affixing flexible member 36 is affixed to the second ends 10b, 12b . . . of the blocks. First and second affixing flexible members are best made from a strap or other flexible construction, so that when stretched out an even space 38 is provided between each pair of blocks.

FIGS. 6 and 7 show, respectively, first faces 10c, 12c . . . and opposite second faces 10d, 12d . . . for the blocks 10–28. First faces 10c, 12c . . . have indicia in the form of dots 40, wherein the total number of dots on each first face is indicated by a numeral on the opposite face of that block. Thus, one block at a time can be used to expose a first face in order to interrogate a child learning numbers as to the number of dots on that first face. His answer can be graphically checked or corrected by exposure of the second or opposite face. Such use is enabled by means of the use of the rotation of the blocks enabled by use of the flexible straps 30, 36, both of which are affixed to the blocks by means of nails or rivets 32, 34 as previously described, or by other means.

Furthermore, FIG. 3 illustrates additional play value for the construction whereby a series of attached blocks as shown in FIG. 2 is tumbled merely by pushing one of the end blocks 10, 28 resulting in the tumbling of that block and each other block in succession. An example of the spacing which would provide convenience in tumbling action is two and one-half inches for a three and three-quarters inch high block. Of course, other spacings will function and will vary according to the size of the block.

FIGS. 4 and 5 illustrate other arrangements of standing blocks enabled by flexible straps 30, 36, which other arrangements are alternative to the straight arrangement illustrated in FIGS. 1 and 2. Accordingly, when an end block 10, 28 is tumbled, the blocks fall in a pattern amusing and interesting for the child.

Throughout all of this description, it is a primary feature to note that throughout use, all of the attached blocks remain together without the problems of lost individual blocks.

Of course, indicia such as letters and words or pictures and other indicia may be used in place of those shown in FIGS. 6 and 7, whereby the second or opposite faces 10d, 12d . . . serve to translate the indicia on the first face 10c, 12c . . . .

In any event, the possible modifications within the scope of this invention are to be limited only by the following claims:

What is claimed is:

1. A game and teaching aid device construction comprising a plurality of blocks, each in a form having first and second ends and first and second opposite faces, and first and second affixing flexible members, each of said first ends being pivotally affixed to said first member and each of said second ends being pivotally affixed to said second member, said first and second faces defining indicia, said second face translating the indicia of said first face.

2. The invention according to claim 1 wherein said first faces define indicia of a number of dots and said second faces define translating indicia indicating said number.

3. The invention according to claim 1 wherein said flexible members are straps.

4. The invention according to claim 1 wherein said members are affixed to said blocks so that said blocks may be equally spaced in relation to the distance between said members to enable toppling of said blocks in sequence when one of said blocks is pushed.

5. The invention according to claim 1 wherein said form is a solid rectangle.

* * * * *